Dec. 17, 1968 H. B. KADAH ET AL 3,417,253

COMPACT PULSE GENERATING DEVICE UTILIZING A TRANSLUCENT EPOXY RESIN ENCAPSULATED TRANSISTOR

Filed April 23, 1965

INVENTORS
HASSAN B. KADAH
MARCEL B. HOSTE
BY Carpenter, Kinney & Coulter
ATTORNEYS United States Patent Office 3,417,253

Patented Dec. 17, 1968

3,417,253

COMPACT PULSE GENERATING DEVICE UTILIZING A TRANSLUCENT EPOXY RESIN ENCAPSULATED TRANSISTOR

Hassan B. Kadah, Manlius, and Marcel B. Hoste, Syracuse, N.Y., assignors to Minnesota Mining and Manufacturing Company, St. Paul, Minn., a corporation of Delaware Filed Apr. 23, 1965, Ser. No. 450,365
9 Claims. (Cl. 250—233)

ABSTRACT OF THE DISCLOSURE

A small compact pulse generating device adapted for driving coupling relation to a driven shaft is shown wherein the device includes an annular-shaped member having at least one aperture extending between its inner and outer sides and the member is adapted for rotation about its axis in response to the rotations of the driven shaft. The member is located with a housing which supports a light source on one side of the member and a translucent epoxy resin encapsulated transistor on the other side of the member such that when the aperture is radially aligned between the light source and the encapsulated transistor, light energy from the light source impinges upon the base of the transistor whereby application of a potential across the collector and emitter of the transistor results in an abrupt change in the transistor's conductive characteristics in response to the absence and presence of light impinging upon the transistor base.

This invention relates to a pulse generating device and in one aspect to a compact generating unit adapted for attachment onto the end of any driven shaft.

It is known in the art to use a hermetically sealed point contact phototransistor in cooperation with a light source to produce an electrical pulse. Such a phototransistor has an opaque enclosing structure formed with a single window or light transmitting lens to direct light energy from the light source directly on the phototransistor junction to generate an output pulse. The light energy is generally interrupted by a rotating disc positioned between a source of light and the phototransistor. When light energy is intermittently applied directly to the junction of this phototransistor the phototransistor will produce an output of electrical pulses.

A disadvantage of such a point contact phototransistor as a component in an electrical pulse generator is that the housing of the phototransistor is fairly large due to the spacing between the junction in relation to the lens forming the window. Since this relationship of the lens to the junction is critical to direct the light energy (photon energy) towards the optimum spot on the phototransistor junction, the size of these phototransistors cannot be decreased. Thus, the known phototransistors cannot be easily mounted and positioned to make a small and compact pulse generator.

The above cited disadvantages of the pulse generator utilizing a point contact phototransistor and the choppers heretofore used in the prior art are overcome by a generator made in accordance with the present invention.

The pulse generator of the present invention is provided with a novel compact light interrupting or chopping member which affords a novel positioning of the light source with respect to the transistor to make the entire generator small and compact.

Additionally, the transistor used in the present invention is of simple and inexpensive construction as compared with the point contact phototransistors.

A generator constructed in accordance with the present invention comprises an NPN planar passivated silicon transistor encapsulated in a translucent cured epoxy resin, which epoxy resin has a thermocoefficient of expansion substantially equal to that of the transistor material. The transistor is positioned with the base of the transistor toward a light source. The chopper comprises a hollow generally cylindrically-shaped member adapted to be rotatably mounted and which is formed with axially extending slots in the side wall portions thereof. A housing suitably supports one of the light source and the transistor within the periphery of the side walls of the cylindrical chopper and supportably positions the other of said light source and transistor adjacent the outer peripheral surface of the cylindrical side walls in radial alignment with each other. The housing substantially encloses the chopper member to avoid stray light reaching the transistor and to avoid dust and dirt collecting on the several parts.

In a preferred embodiment of the pulse generator of the present invention the transistor comprises a base, a collector and an emitter and the collector is adapted for connection to a positive potential or in a manner such that the collector is positive relative to the emitter. The base is floating, i.e, it is not adapted for connection to a lead. The transistor is positioned within the housing such that the base of the transistor faces the light source. Thus, as the light strikes the base the impedance decreases abruptly from a high impedance value to a low impedance value making the transistor substantially conductive. When the light energy is interrupted, the impedance between the collector and emitter immediately increases to a high impedance value and the transistor becomes nonconductive. When a potential is placed between the collector and emitter of the transistor, said transistor produces a pulse when it changes abruptly from either its conductive or nonconductive state to the other for a brief interval and back to its initial state.

The pulse generator of the present invention is more fully described hereinafter and two embodiments are illustrated in the accompanying drawing wherein.

Figures 1, 2, 3, 4, 5:
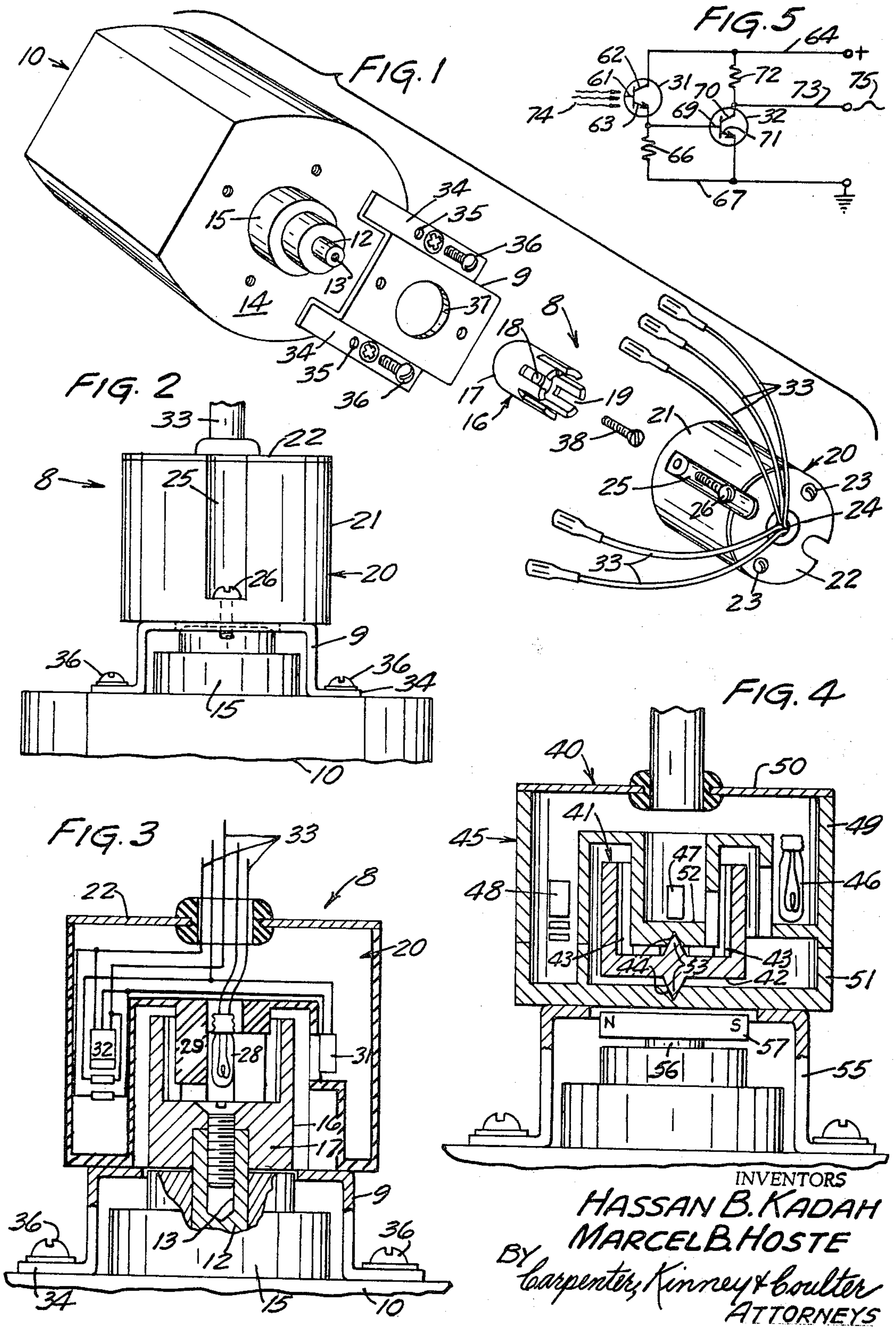
FIGURE 1 is an isometric view illustrating an embodiment of a pulse generator formed in accordance with the present invention in a disassembled relation with respect to a motor.
FIGURE 2 is a plan view of the generator of FIGURE 1 mounted on a motor.
FIGURE 3 is a sectional view of the pulse generator taken along the center line of the generator of FIGURE 2 and the wiring is shown schematically.
FIGURE 4 is a sectional view of a second embodiment of a pulse generator formed in accordance with the present invention.
FIGURE 5 is a schematic circuit diagram of a pulse generator formed in accordance with the present invention.

Referring now to the drawing and particularly to FIGURES 1, 2 and 3, there is is illustrated a pulse generator assembly.

Referring now to the drawing, and particularly to FIGURES 1 through 3 there is illustrated a pulse generator, designated generally by the reference numeral 8, adapted for mounting by means of a bracket 9 to a motor 10. The motor 10 has a driven shaft 12, which shaft is suitably supported in the motor frame 14 by means of bearings supported in bearing housings 15. The driven shaft 12 is center-bored and threaded as at 13.

The pulse generator 8 comprises a hollow cylindrical light interrupting or chopper member 16 having an end wall 17 substantially enclosing one end of the cylindrical side wall adjacent one end thereof. The end wall is recessed on one side and has a center bore 18 therethrough affording a rotatable support for the chopper member 16 and a driving connection with the shaft 12. A plurality of axially extending apertures or slots 19 are formed in the cylindrical side wall of said member 16, thus forming an annular-shaped member with circumferentially aligned apertures. A housing 20 substantially encloses the chopper member 16. This housing 20 has a generally cylindrical body member 21 and an end cap 22. The cap 22 is secured to the body by means of fasteners such as the screws 23 and has a central opening which receives a grommet 24. On diagonally opposite sides of the body 21 are axially extending grooves 25 which terminate adjacent one end of the body member. At the end of the grooves 25 the body 21 is provided with axially extending holes to receive fastening screws 26. The fastening screws serve to retain the housing 20 onto the bracket 9. The body 21 of the housing 20 is adapted to support a light source such as an incandescent lamp 28 substantially centrally thereof and is provided with a central cresent-shaped wall portion 29 which extends around the lamp 28 on one side thereof. The wall portion 29 and the lamp 28 are adapted to be disposed within the cylindrical side wall of the chopper member 16 when the generator is in assembled relation as shown in FIGURES 2 and 3. The body also supports a phototransistor 31 adjacent the outer peripheral surface of the side wall of the chopper member 16. Also mounted within the housing 20 is a single stage transistor amplifier 32. Suitable leads 33 extend through the cap 22 of the housing 20 and will be discussed in greater detail when describing the circuitry of the electrical elements within the housing.

In assembly, the bracket 9 which is of generally channel shape is formed with outwardly extending flange portions 34 adjacent the side walls. These flange portions are each formed with an opening 35 to receive a fastening screw 36 for bolting the bracket to the frame 14 of the motor 10. Centrally of the channel-shaped bracket 9 is an enlarged opening 37 adapted to receive therethrough the driven shaft 12 of the motor 10.

The cylindrical chopper member 16 is fitted on the end of the drive shaft 12 with the opening 18 in aligned relationship with the threaded opening 13 in the end of the shaft 12. A fastener such as a screw 38 is placed through the opening 18 and is threaded into the bore 13 at the end of the driven shaft 12 to provide a driving coupling with said shaft. The pulse generator housing 20 is fitted around the chopper member 16 and is securely fastened to the bracket 9 by means of the screws 26.

With the housing in position as shown in FIGURES 2 and 3, the lamp 28 is disposed interiorly of the side wall of the chopper member 16 and the phototransistor 31 is positioned closely adjacent the outer peripheral surface of the side wall.

In a preferred embodiment of the pulse generator 8, the chopper member 16 has a diameter of about $^{11}\!/_{16}$ inch (18 millimeters) and a length of about $^{11}\!/_{16}$ inch (18 millimeters) and the housing 20 has a diameter of about $1\frac{3}{8}$ inches (36 millimeters) and an overall length of about $1\frac{1}{8}$ inches (28 millimeters).

Referring now to the embodiment shown in FIGURE 4, a pulse generating device 40 is shown which is similar to the generator 8 shown in FIGURES 1 through 3. Here the chopper member 41 is a generally cylindrically-shaped member having a closed end wall 42 and has axially extending slots 43 formed in the side wall. Extending axially and concentrically from each side of the end wall 42 is a conical-shaped supporting member 44. The cylindrical chopper member 41 is preferably made from a magnetic material. In this embodiment a housing 45 is formed to receive and support a light source such as an incandescent lamp 46, a phototransistor 47 encapsulated in a cured epoxy resin and positioned interiorly of the cylindrical side wall of the chopper member 41. The housing 45 is also formed to receive and support a single stage transistor amplifier 48. The housing 45 includes a body portion 49, and a pair of end caps 50 and 51. The cap 50 closes one end portion of the body 49 and provides an opening to receive the leads to the electrical elements supported within the housing 45. The opposite end of the body 49 is enclosed by the end cap 51 to completely enclose the chopper member 41 within the housing 45. The center portion of the end cap 51 and a lower center portion 52 of the body 49 are each formed with conical recesses 53 which cooperate with the conical members 44 on the cylindrical chopper member 41 to provide a journal for the chopper member which permits free rotation thereof within the housing. In this embodiment the housing 45 is mounted on a suitable supporting bracket 55 to position the generator 40 adjacent the end of a driven shaft 56. On the end of the driven shaft is mounted a magnet 57. When the magnet 57 is rotated by the driven shaft 56 there is a driving coupling between the shaft 56 and the slotted chopper member 41 due to the formation of the chopper member from magnetic material. This magnetic coupling provides suitable driving coupling between the chopper member 41 and the driven shaft 56. Rotation of the cylindrical chopper member 41 thus causes intermittent interruption of the light resulting in the generation of pulses by the phototransistor 47, which pulses are amplified by the transistor amplifier 48.

Referring now to FIGURE 5 a schematic circuit diagram of the electrical elements of the pulse generator is illustrated. Since the circuitry for the generators 8 and 40 are the same only the circuitry for the embodiment of FIGURES 1–3 will be described. The phototransistor 31 is an NPN planar passivated silicon transistor encapsulated in a cured transluent epoxy resin having a base 61, collector 62 and emitter 63. The phototransistor 31 is positioned such that the base 61 will receive light energy directly from the light source when a slot 19 in the slotted chopper member 16 is in alignment between the lamp 28 and the base 61 of the phototransistor 31. The collector 62 is connected to a source 64 of positive potential and the emitter 63 is connected to one end of a load resistor 66. The other end of the load resistor 66 is connected to a ground conductor 67. The single stage transistor amplifier 32 has a base 69, a collector 70 and an emitter 71. The base 69 is connected to the emitter 63 of the phototransistor 31. The collector 70 of the transistor 32 is connected to one end of a second load resistor 72. The other end of the resistor 72 is connected to the source 64 of positive potential. The emitter 71 of the transistor 32 is connected to the ground conductor 67. An output conductor 73 is connected to the collector 70 of the transistor 32.

In the presence of light energy, the impedance between the collector 62 and the emitter 63 of the phototransistor 31 is at a relatively low value causing said phototransistor to be conductive. When the phototransistor 31 is conductive, current flows from the potential source 64 through the phototransistor 31 and the first load resistor 66 to the ground conductor 67. The current causes a voltage drop across the first load resistor 66 thereby causing the potential of the base 69 of the transistor 32 to follow the potential of the emitter 63. During the interval when the transistor 32 is conductive, the potential of the base 69 of the transistor 32 is positive relative to its emitter 71 driving the transistor 32 into conduction. When the transistor 32 conducts, current flows from the potential source 64 through the second load resistor 72, the collector 70 and the emitter 71 of the transistor 32 to the ground conductor 67. When the transistor 32 is in its conductive state the output conductor 73 is connected to the ground conductor 67 through the collector 70 and the emitter 71 of the transistor 32. When the light energy, illustrated at 74, from the incandescent lamp 28 is interrupted by a portion of the cylindrical side wall of the chopper 16 and prevented from impinging on the exposed base 61 of the phototransistor 31 the impedance between the collector 62 and the emitter 63 of said phototransistor abruptly increases thereby making the phototransistor 31 substantially nonconductive. At this point the potential of the emitter 63 reduces the the potential of the base 69 of the transistor 32 to nearly the potential of the ground conductor 67. The potential of the emitter 71 is then nearly the same as the base 69 and the transistor 32 is nonconductive. The potential of the collector 70 raises quickly to the potential of the potential source 64. The potential of the output conductor 73 which conductor is connected to the collector 70, is held at the potential of the potential source 64 until he transistor 32 is made conductive again. The transistor 32 will be made conductive when the light energy 74 is again passed through a slot 19 in the cylindrical side wall of the chopper member 16. When the transistor 32 is driven back into conduction the output lead 73 is substantially connected to the ground conductor 67 by the collector 70 and the emitter 71 of the transistor 32. An output pulse, for example a pulse as shown by the wave form 75 is produced. The duration or width of the pulse is determined by the revolutions of the rotating cylindrical chopper member 16 and the width of the slots 19. The number of pulses per revolution of the slotted chopper member 16 is determined by the number of slots 19 in the cylindrical side wall of said slotted chopper member and by its rotational speed. The maximum number of discrete pulses which may be obtained per second is determined by the frequency response of the phototransistor. Typical frequency response of the pulse generator of the type of the present invention is in the 5 kilocycle range. However, the frequency response of the cured epoxy encapsulated planar passivated silicon transistor 31 in this application is approximately one megacycle.

Operation of the pulse generator of the present invention may also be obtained with equal success by placement of the phototransistor within the cylindrical cavity of the chopper member as illustrated in FIGURE 4 by placing the light source adjacent the outer peripheral surface of the chopper member. It is however a preferred embodiment to place the incandescent lamp in the center of the chopper member and to provide the central portion or wall surface 29 of the housing 20 which extends downwardly within the side wall of the cylindrical chopper member with a reflective coating to increase the amount of useable light from the incandescent lamp.

Having thus described the present invention it will be appreciated that certain changes and variations may be made therein without departing from the scope or spirit of the invention.

What is claimed is:

1. A pulse generator, comprising:
(a) an annular-shaped member formed with at least one aperture extending between its inner and outer sides, said member having means adapting the same for rotation about its axis;
(b) a light source;
(c) a translucent epoxy resin encapsulated transistor having a base, a collector and an emitter, said transistor exhibiting an abrupt change in the impedance between said collector and emitter when light impinges upon said base;
(d) a housing positioned around said member, said housing having means supporting said light source on one side of said member and radially aligned with said at least one aperture, and means supporting said transistor on the other side of said member and radially aligned with said light source and said at least one aperture such that light from said light source will impinge upon said base of the transistor when the aperture in said member is in radial alignment with said base and said light source whereby when a potential is placed across said collector and emitter an abrupt change in the conductive characteristic of said transistor will occur.

2. A pulse generator, comprising:
(a) an annular-shaped member formed with a row of circumferentially aligned apertures extending between its inner and outer sides, said member having means adapting the same for rotation about its axis;
(b) a light source;
(c) a transistor having a base, a collector and an emitter encapsulated in a translucent cured epoxy resin, said transistor exhibiting an abrupt change in the impedance between said collector and emitter when light impinges upon said base;
(d) a housing positioned around said member, said housing having means supporting said light source on one side of said member and radially aligned with said row of apertures, and means supporting said transistor on the other side of said member and radially aligned with said light source and said row of apertures such that light from said light source will impinge upon said base of the transistor when an aperture in said member is in radial alignment with said base and said light source whereby when a potential is placed across said collector and emitter an abrupt change in the conductive characteristic of said transistor will occur.

3. A small compact pulse generating device adapted for driving coupling relation to any driven shaft comprising:
(a) a hollow cylindrically-shaped member having a cylindrical side wall and an end wall, said side wall being formed with circumferentially aligned apertures;
(b) means for mounting said member for rotation about its axis;
(c) a light source;
(d) a transistor having a base, an emitter and a collector encapsulated in a translucent cured epoxy resin;
(e) a housing substantially enclosing said member, said housing having means for supporting said light source on one side of said side wall and for supporting said transistor adjacent the other side of said side wall, and means adapted for mounting said housing adjacent the end of a said driven shaft.

4. A small compact pulse generating device adapted for driving coupling relation to any driven shaft, comprising:
(a) a hollow cylindrically-shaped member having a cylindrical side wall and an end wall, said side wall being formed with axially extending circumferentially spaced slots;
(b) a light source;
(c) a transistor having a base, a collector and an emitter, said transistor being encapsulated in a translucent cured epoxy resin and exhibiting an abrupt change in the impedance between said collector and emitter when light impinges upon said base to produce an output pulse;
(d) an amplifier connected to said transistor to amplify said output pulse;
(e) a cylindrically-shaped housing substantially enclosing said side wall of said member, said housing having means for supporting said light source on one side of said side wall and for supporting said transistor adjacent the other side of said side wall, and means adapted for mounting said housing adjacent the end of a said driven shaft.

5. A small compact pulse generating device adapted for driving coupling relation to any driven shaft, comprising:
(a) a hollow cylindrically-shaped member having a cylindrical side wall and an end wall, said side wall being formed with axially extending circumferentially spaced slots, said end wall having an opening concentric with said side wall to receive a fastening member affording a drive coupling with a said driven shaft;
(b) a light source;
(c) a transistor having a base, a collector and an emitter, said transistor being encapsulated in a translucent cured epoxy resin and exhibiting an abrupt change in the impedance between said collector and emitter when light impinges upon said base;

(d) a cylindrically-shaped housing substantially enclosing said side wall, said housing having means for supporting said light source on one side of said side wall and for supporting said transistor adjacent the other side of said side wall, and means adapted for mounting said housing adjacent the end of a said driven shaft.

6. The pulse generating device as set forth in claim 5 wherein:

(a) said light source includes an incandescent lamp being mounted concentric within said cylindrical side wall; and (b) said transistor being mounted adjacent the outside of said cylindrical side wall.

7. A small compact pulse generating device adapted for driving coupling relation to any driven shaft, comprising:

(a) a hollow cylinudrically-shaped member having a cylindrical side wall and an end wall, said side wall being formed with axially extending circumferentially spaced slots, said end wall having an opening concentric with said side wall to receive a fastening member affording a drive coupling with a said driven shaft;

(b) a light source;

(c) a phototransistor having a base, a collector and an emiter, said phototransistor being encapsulated in a translucent cured epoxy resin and exhibiting an abrupt change in the impedance between said collector and emitter when light impinges upon said base to produce an output pulse;

(d) a source of potential having a first and second terminal, said first terminal of the potential source being connected to said collector of the phototransistor;

(e) a first resistor having one end connected to said emitter of the phototransistor and its other end connected to said second terminal of the potential source;

(f) an amplifier transistor having a base, a collector and an emitter for amplifying the output pulse, said base of the amplifier transistor being connected to said emitter of the phototransistor and to said one end of the first resistor, said emitter of the amplifier transistor being connected to said second terminal of the potential source;

(g) a second resistor having one end connected to said collector of the amplifier transistor and its other end connected to said first terminal of the potential source;

(h) output means connected to said one end of the second resistor and to said collector of the amplifier transistor and adapted for conducting said amplified output pulse to a pulse responsive device; and (i) a cylindrically-shaped housing substantially enclosing said member, said housing having means for supporting said light source on one side of said cylindrical side wall and said phototransistor adjacent the other side of said side wall and for supporting said amplifier transistor and said first and second resistor within said housing, and means adapted for mounting said housing adjacent the end of a said driven shaft.

8. A small compact pulse generating device adapted for driving coupling relation adjacent a driven shaft, which shaft has a magnet attached to one end thereof, said pulse generating device, comprising:

(a) a hollow cylindrically-shaped member formed of magnetic material and having a cylindrical side wall and an end wall, said side wall having axially extending circumferentially spaced slots, said end wall having means attached thereto affording a rotatable support for said member;

(b) a light source;

(c) a transistor having a base, a collector and an emitter, said transistor being encapsulated in a translucent cured epoxy resin and exhibiting an abrupt change in the impedance between said collector and emitter when light impinges upon said base;

(d) a cylindrically-shaped housing substantially enclosing said cylindrical side wall and having means cooperating with said means attached to said end wall of said member to rotatably support said member, means for supporting said light source on one side of said side wall and for supporting said transistor adjacent the other side of said side wall, and means adapted for mounting said housing adjacent a said driven shaft with said end wall disposed adjacent the magnet mounted on the end of a said driven shaft to afford a magnetic coupling between said member and the magnet mounted on said end of a said driven shaft.

9. A small compact pulse generating device adapted for driving coupling relation adjacent a driven shaft, which shaft has a magnet attached to one end thereof, said pulse generating device, comprising:

(a) a hollow cylindrically-shaped member formed of magnetic material and having a cylindrical side wall and an end wall, said side wall having axially extending circumferentially spaced slots, said end wall having a conically-shaped member disposed on each side of said end wall and concentric with the axis of said side wall, said conically-shaped members affording a rotatable support for said cylindrically-shaped member;

(b) a light source;

(c) a transistor having a base, a collector and an emitter, said transistor being encapsulated in a translucent cured epoxy resin and exhibiting an abrupt change in the impedance between said collector and emitter when light impinges upon said base;

(d) a cylindrically-shaped housing substantially enclosing said cylindrical side wall and having means cooperating with said conically-shaped members to rotatably support said cylindrically-shaped member, means for supporting said light source on one side of said side wall and for supporting said transistor adjacent the other side of said side wall, and means adapted for mounting said housing adjacent a said driven shaft with said axis of the conically-shaped members aligned with the axis of a said driven shaft and said side wall and with said end wall disposed adjacent the magnet mounted on the end of a said driven shaft to afford a magnetic coupling between said member and the magnet mounted on said end of a said driven shaft.

References Cited

UNITED STATES PATENTS

| | | | |
|---|---|---|---|
| 2,967,279 | 1/1961 | Beck | 250—211 X |
| 3,235,742 | 2/1966 | Peters | 250—233 |
| 3,286,096 | 11/1966 | Finlay | 250—233 X |

RALPH G. NILSON, *Primary Examiner.*

T. N. GRIGSBY, *Assistant Examiner.*

U.S. Cl. X.R.

250—211, 214, 239